United States Patent
Dibernardo

(10) Patent No.: US 7,031,658 B2
(45) Date of Patent: Apr. 18, 2006

(54) SYSTEM AND METHOD FOR SINGLE RADIO RETRANSMISSION USING A HALF DUPLEX RADIO

(75) Inventor: Anthony Joseph Dibernardo, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 419 days.

(21) Appl. No.: 10/382,924

(22) Filed: Mar. 7, 2003

(65) Prior Publication Data

US 2004/0176028 A1    Sep. 9, 2004

(51) Int. Cl.
*H04B 3/36* (2006.01)

(52) U.S. Cl. .............. 455/15; 455/7; 455/18; 455/161.2; 370/279; 370/337; 370/347

(58) Field of Classification Search .......... 455/7, 455/9, 15, 18, 161.2, 167.1; 370/280, 279, 370/337, 347
See application file for complete search history.

(56) References Cited

U.S. PATENT DOCUMENTS

| 5,442,803 | A | | 8/1995 | Furuya |
| 5,517,548 | A | * | 5/1996 | Engelke et al. ............... 379/52 |
| 6,115,369 | A | * | 9/2000 | Oura .......................... 370/337 |
| 6,342,777 | B1 | | 1/2002 | Takahashi |
| 6,459,881 | B1 | | 10/2002 | Hoder |

* cited by examiner

*Primary Examiner*—Nay Maung
*Assistant Examiner*—Philip J. Sobutka
(74) *Attorney, Agent, or Firm*—Duane Morris LLP

(57) ABSTRACT

Single radio retransmission with a half duplex radio accomplished using Time Division Duplexing to alternate between transmit and receive cycles of a retransmission radio. This allows a single half duplex radio to function as the retransmission radio. The retransmission half duplex radio may be utilized in a communication system comprised of a plurality of remote units to increase communication range and area coverage and perform channel conversion.

32 Claims, 2 Drawing Sheets

SYSTEM AND METHOD FOR SINGLE RADIO RETRANSMISSION USING A HALF DUPLEX RADIO

BACKGROUND

Radio retransmission is widely used with portable radio systems. It is well known to relay communication between radio frequency units using Time Division Duplexing (TDD). For example, U.S. Pat. No. 6,342,777 issued to Takahashi on Jan. 29, 2002 discloses a TDD portable telephone relay device for use with a radio base station and a portable telephone terminal within a building. The disclosed system provides a TDD relay device that is wired to a base station for relaying a radio telephone channel between the base station and a portable phone located within an electrical-signal-insensitive region in the building. This retransmission, however, is accomplished in a cellular environment in a full-duplex TDD mode and may not meet the mobility requirements of certain communication systems.

Radio retransmission using a half duplex radio may be accomplished through several known methods. For example, in U.S. Pat. No. 5,442,803 issued to Furuya on Aug. 15, 1995 a half duplex radio communication system is disclosed having a plurality of radios and two base stations for relaying communications between two of the radios each of which is in communication with one of the base stations. The disclosed system assigns channels in a communication network for half duplex radio communications between the two radios via the two base stations collectively serving as a repeater station. This system, however, utilizes channel assignment rather than TDD to achieve a radio retransmission. Retransmission in half duplex radios may also be accomplished with two radios operatively cabled together. One radio operates as a receive radio and sends its received signal via the cable to the second radio which then rebroadcasts the signal. Although this method accomplishes single radio retransmission, there are several problems with this and other prior methods.

For example, soldiers in the field may wish to travel as light as possible. However, if a group desires to use the retransmission feature in present half duplex systems, they are required to carry two sets of radio equipment (radios, batteries, antennas) as well as cable to link together the two radios. It should also be noted that most radios fielded by soldiers are half duplex rather than full duplex. This is due to the cumbersome nature of current full duplex systems. Thus, the overhead of current half duplex systems is both costly and burdensome. In addition to equipment problems, users may also have to cope with electrical issues. A physical distance may be required between the radios to avoid interference when using two half duplex radios to perform retransmission. The physical distance must also be accompanied by a difference in frequency. If the transmitting half duplex radio were to rebroadcast the signal at the same frequency, the received signal of the first radio may interfere with the transmission of the second radio. Undesirable harmonics may result from rebroadcasting the signal when using different frequencies. Another issue may arise with known half duplex radio retransmission systems in a secure transmission environment. When conducting secure radio retransmissions in present half duplex systems, users may field the retransmission radios and leave them unattended due to the cumbersome nature of the radios while performing their mission. Communications protocols or cryptographic information may be compromised in the event this retransmission equipment fell into the wrong hands. Thus, a need exists to create a more manageable and efficient half duplex radio retransmission system.

It is therefore an object of the present disclosure to obviate the deficiencies of the prior art and present a novel half duplex radio for facilitating communication between two remote terminals using TDD. Embodiments of the apparatus may comprise of a receiver means for receiving data from a remote transmitting terminal, a buffering means for storing the data and a transmitter means for transmitting the buffered data to a receiving terminal.

It is another object of the present disclosure to provide a novel method of retransmission of data and range extension of data using TDD in half duplex radios comprising the steps of transmitting the data from a first half or full duplex radio to a retransmission half duplex radio wherein the retransmission half duplex radio buffers the data and retransmits the buffered data to a second half or full duplex radio.

It is a further object of the present disclosure to provide a novel system of data retransmission system using TDD comprising a first half or full duplex radio that transmits data to a retransmission half duplex radio. The retransmission half duplex radio receives the transmitted data from the first radio, buffers the data and retransmits the data to a second half or full duplex radio.

It is also an object of the present disclosure to provide a novel method of channel conversion of communicated data using TDD comprising the steps of transmitting the data from a first half or full duplex radio to a retransmission half duplex radio wherein the retransmission radio scans at least two different channels until data is received from one of the at least two different channels. An embodiment of this method also includes receiving the data by the retransmission half duplex radio, buffering the data in the retransmission radio, transmitting the buffered data by the retransmission radio and receiving the transmitted buffered data by a second half or full duplex radio.

It is yet another object of the present invention to provide a novel system of channel conversion of communicated data using TDD where a first half or full duplex radio transmits data to a retransmission half duplex radio wherein the retransmission radio receives, buffers and retransmits the data to a second half or full duplex radio.

DETAILED DESCRIPTION

Figure 1:
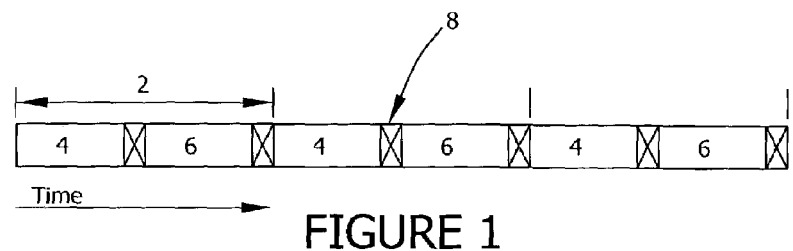
FIG. 1 is a diagram illustrating the division of channel resources into fixed size frames with Time Division Duplexing.

Directing attention to FIG. 1, channel resources of a communication system may be divided in time into fixed size frames 2 with Time Division Duplexing (TDD). Each frame 2 is subdivided into a transmit segment 4 and a receive segment 6. The transmit segment 4 and receive segment 6 have a sufficient transition period 8 between the segments to allow for a radio to transition from receive to transmit and from transmit to receive. To achieve full duplex capabilities, a radio may concurrently receive in the receive segment 6 and transmit in the transmit segment 4. All data is burst in the segments at a rate more than twice the overall throughput rate. For example, the frame 2 length may be one second and the data may have a transmission requirement of 16 kbps. As a result, 16 kbits of data must be transmitted and received every frame. Therefore, 16 kbits of data must be transmitted in the transmit segment 4 and received in the receive segment 6. Due to the transition periods 8, each of these segments is less than 0.5 seconds. Consequently, if the radio bursts and receives data at 32 kbits per second or twice the desired throughput rate, the radio may not be able to burst and receive all 16 kbits of data in the transmit segment 4 and receive segment 6. Therefore, the data must be burst at a rate more than twice the overall throughput rate.

Figure 2:
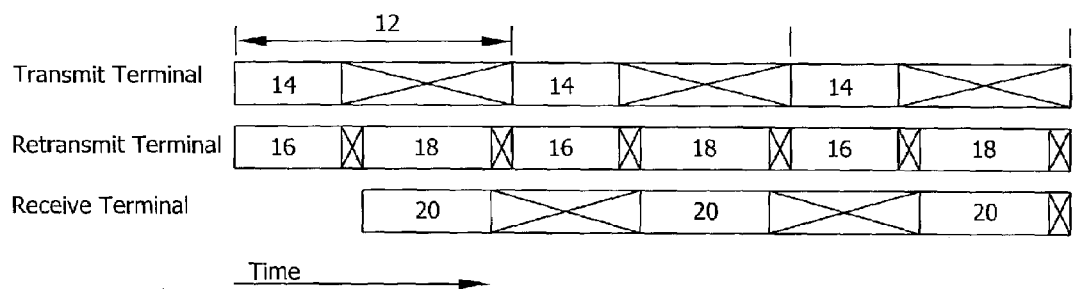
FIG. 2 is a diagram illustrating an embodiment of the present invention using Time Division Duplexing in a radio system for data retransmission.
Figure 3:
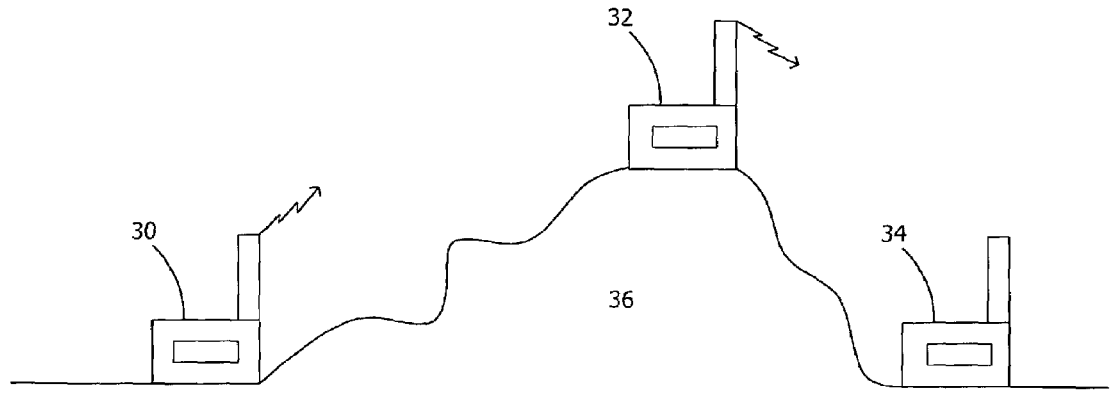
FIG. 3 is a depiction of a system using a half duplex radio for retransmission for range extension of a communicated signal.

With reference to FIGS. 2 and 3, performing retransmission using TDD with half duplex radios requires at least a transmitting half or full duplex terminal 30, a retransmission half duplex radio 32 and a receiving half or full duplex terminal 34. It should be noted that the transmit and receive radios may be half or full duplex radios depending upon the communication network requirements and resources. It may be preferable that all half duplex radios in a desired communication network be configured for TDD operation as shown in FIG. 2. The transmitting half or full duplex terminal 30 uses only the transmit segment 14 of each frame 12 to transmit data. The receiving half or full duplex terminal 34 uses only the receive segment 20 of each frame 12 to receive data. The retransmission half duplex radio 32 receives data in its receive segment 16, buffers the data, and then transmits the buffered data in its transmit segment 18. The buffer may have various storage attributes including, but not limited to, an input pointer where new data may be written into the buffer, an output pointer where the next item may be read from, a counter for acknowledging the amount of used or free space, and a control means or algorithm. There are many different algorithms for controlling buffers that may include, but are not limited to, a first-in first-out algorithm (FIFO or shelf), a last-in first-out algorithm (LIFO or stack), a double buffer which allows one buffer to be read while another is being written, or a cyclic buffer where reading or writing the data past a storage end wraps the data around to the beginning. Buffers may also be used to decouple certain processes so that the reader and writer may operate at different speeds or on different sized blocks of data.

FIG. 2 depicts an exemplary radio retransmission system according to one embodiment of the present invention. It will be understood by those of skill in the art that although FIG. 2 shows a half duplex radio as the transmitting terminal and a half duplex radio as the receiving terminal, embodiments of the present invention contemplate the use of either a half or full duplex radio as the transmitting terminal and either a half or full duplex radio as the receiving terminal. As shown in FIG. 2, the retransmission half duplex radio 32 segments are offset from the transmitting half or full duplex terminal 30 and receiving half or full duplex terminal 34 segments by one half frame. This offset may ensure that the receive segment 16 of the retransmission half duplex radio 32 occurs during the transmit segment 14 of the transmitting terminal 30. The offset may further ensure that the transmit segment 18 of the retransmission half duplex radio 32 occurs during the receive segment 20 of the receiving terminal 34.

It may be preferable that the transmitting terminal 30 establish the frame timing of the transmission sequence to ensure transmission synchronization. Consequently, the frame timing of the receiving radio 34 and retransmission radio 32 are relative to the frame timing of the transmitting radio 30. If the transmitting radio 30 and receiving radio 34 are half duplex radios, then it follows that the transmit and receive segments occur at different times. Accordingly, if the transmitting radio 30 and receiving radio 34 are full duplex radios, the transmit and receive segments occur at the same time.

Consider the illustration of FIG. 3 where a transmitting half or full duplex unit 30 and a receiving half or full duplex unit 34 may use the same transmit and receive frequencies to communicate. If a distance greater than the capabilities of the radio or if an obstacle such as a mountain 36 physically separates the transmitting and receiving radio units, the radios may use TDD for a radio retransmission to increase communication coverage range. Since the receive segment 16 and transmit segment 18 are physically separated in time, the possibility of transmitting over the receive signal is minimized or eliminated and frequency separation and frequency harmonics may no longer pose a problem. Therefore, the half duplex radio retransmission system disclosed may operate in any frequency band, an HF frequency band, VHF frequency band, UHF frequency band, or any combination thereof.

Figure 4A:
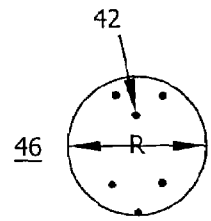
FIGS. 4A and 4B are a diagrams depicting an embodiment of the invention showing an increased theoretical communication radius resulting from single radio retransmission.
Figure 4B:
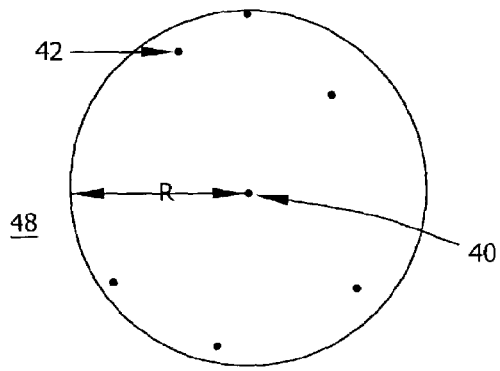

As shown in FIGS. 4A and 4B, using TDD for half duplex radio retransmission may quadruple the area a communication system may cover. For example, consider a theoretical range limitation R of a half duplex radio 42 illustrated in FIG. 4A. For effective communication between every radio unit in the communication network, each radio 42 must be within R of the others. The full area 46 of effective communication coverage is given by the relationship:

$$A_{4A} = \pi(R/2)^2 = (\pi R^2)/4$$

By placing a half duplex retransmission radio 40 in the center of a desired coverage area, the total area 48 of effective communication coverage may theoretically quadruple as shown in FIG. 4B and given by the relationship:

$$A_{4B} = \pi R^2 = 4(A_{4A})$$

Figure 5:
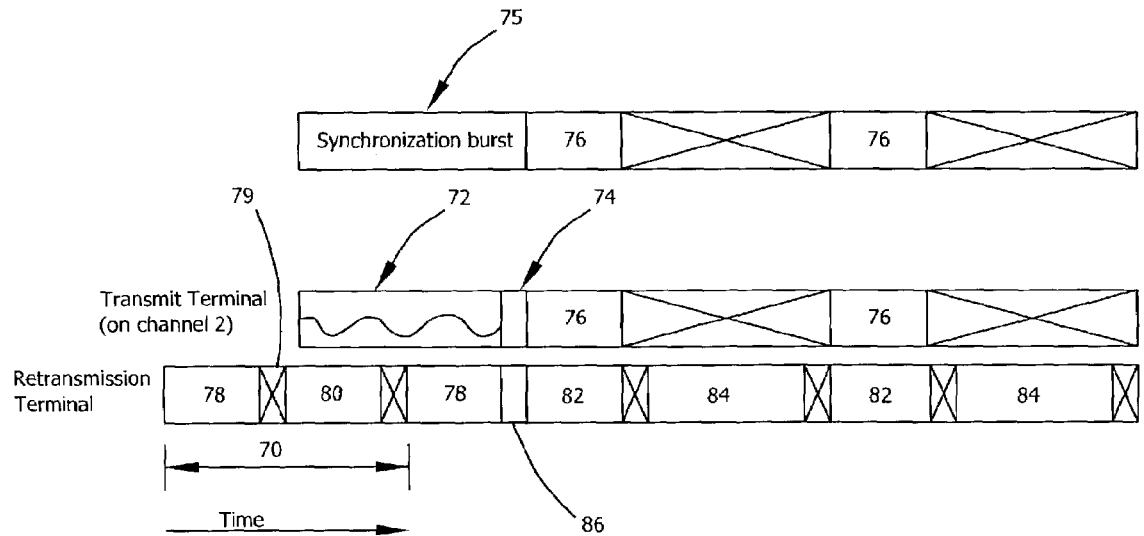
FIG. 5 is a diagram of channel conversion illustrating an embodiment of the present invention using a half duplex radio system incorporating a TDD scan.

FIG. 5 depicts an exemplary radio retransmission system according to an embodiment of the present invention. It will be understood by those of skill in the art that although FIG. 5 shows a half duplex radio as the transmitting terminal, embodiments of the present invention contemplate the use of either a half or full duplex radio as the transmitting terminal. As shown in FIG. 5, another mode of operation using TDD for radio retransmission purposes is the performance of channel conversion. Channel conversion allows at least one unit operating on a first channel to communicate with a second unit operating on a second channel. For example, a retransmission half duplex radio conducts a continuous TDD scan 70 when not actively transmitting or receiving. This TDD scan 70 may comprise monitoring a first channel 80 and a second channel 78. The transmitting terminal, operating on the second channel 78, transmits a synchronization burst 75 prior to transmitting the first transmit segment 76. The synchronization burst may be, but is not limited to, a synchronization tone 72 and synchronization preamble 74. The length of the synchronization burst should be long enough for the retransmission half duplex radio to scan at least two channels and any transition periods 79, detect the synchronization burst 75. Upon receipt of the transmission in the second channel receive segment 82 from a transmitting unit, the retransmission half duplex radio buffers the data and retransmits the data to a receiving half or full duplex radio terminal (not shown) in the first channel transmit segment 84. A frequency hopping scheme may be utilized by the retransmission half duplex radio. It may be preferred that one channel is fixed while the second channel is frequency hopped or it may be preferred that all channels are frequency hopped depending upon the desired communication network. If the desired communication system requires more than two channels, during multi-channel operations, the synchronization burst 75 should lengthen to ensure adequate synchronization time for the transmitting, receiving, and retransmission radios.

It shall be appreciated that, although the half duplex radio retransmission system is described with reference to a transmitter, receiver and relay unit, the adaptation of the half duplex radio retransmission system is not limited to any particular portion of a communication system or network. It may be preferable to operate the disclosed half duplex retransmission system in a number of frequency bands, e.g. HF, VHF, and UHF, or any number of desired channels depending upon the requirements of the communication network or system.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal thereof.

I claim:

1. A half duplex radio for facilitating communication of data between two remote terminals using Time Division Duplexing where channel resources are divided in time into fixed size frames comprising:
   a receiver means for receiving data from a remote transmitting terminal in a receive segment of said fixed size frame wherein said remote transmitting terminal establishes a frame timing of said fixed size frame;
   a buffering means for storing the data said buffering means comprising at least an input pointer, an output pointer, a counter and a control means; and,
   a transmitter means for transmitting said data to a remote receiving terminal in a transmit segment of said fixed size frame.

2. The half duplex radio of claim 1 wherein a frequency scanning means is utilized to monitor at least two frequency channels.

3. The half duplex radio of claim 1 wherein said frame timing is a function of the time of the start of the data transmission from the remote transmitting terminal.

4. A method of retransmission of data using Time Division Duplexing in half duplex radios where channel resources are divided in time into fixed size frames comprising the steps of:
   (a) transmitting a first set of data from a first half duplex radio in a transmit segment of a first fixed size frame wherein said first half duplex radio establishes a frame timing of said first fixed size frame;
   (b) receiving said first data set from said first half duplex radio by a second half duplex radio in a receive segment of said first fixed size frame;
   (c) buffering said first data set in said second half duplex radio;
   (d) transmitting said first data set by said second half duplex radio in a transmit segment of said first fixed size frame; and,
   (e) receiving said first data set by a third half duplex radio in a receive segment of said first fixed size frame.

5. The method of claim 4 wherein a frequency scanning means is utilized to monitor at least two frequency channels.

6. The method of claim 4 further comprising the step of transmitting a second set of data from said first half duplex radio in a transmit segment of a second fixed size frame wherein said first half duplex radio establishes a frame timing of said second fixed size frame that is different than said frame timing of said first fixed sized frame.

7. A data retransmission system using Time Division Duplexing where channel resources are divided in time into fixed size frames comprising:
   a first radio wherein said first radio transmits data to a half duplex radio in a transmit segment of said fixed size frame and wherein said first radio establishes a frame timing of said fixed size frame;
   said half duplex radio receiving the data from said first radio in a receive segment of said fixed frame, said half duplex radio further buffering the data and retransmitting the data to a second radio in a transmit segment of said fixed frame; and,
   said second radio receiving the data from said half duplex radio in a receive segment of said fixed frame.

8. The system of claim 7 wherein a frequency scanning means is utilized to monitor at least two frequency channels.

9. The system of claim 7 wherein at least one of said half duplex radios is mobile.

10. The system of claim 7 wherein at least one of said half duplex radios is handheld.

11. The system of claim 7 wherein said first radio is a half duplex radio.

12. The system of claim 7 wherein said second radio is a half duplex radio.

13. A method of extending the range of communicated data using Time Division Duplexing where channel resources are divided in time into fixed size frames comprising the steps of:
   (a) transmitting said data from a first radio in a transmit segment of said fixed size frame wherein said first radio establishes a frame timing of said fixed size frame;
   (b) receiving said data from the first radio by a half duplex radio in a receive segment of said fixed size frame;
   (c) buffering the data in said half duplex radio;
   (d) transmitting the data by said half duplex radio in a transmit segment of said fixed size frame; and,
   (e) receiving said data by a second radio in a receive segment of said fixed size frame.

14. The method of claim 13 wherein said half duplex radio frequency scans to monitor at least two frequency channels.

15. The method of claim 13 wherein said first radio is a half duplex radio.

16. The method of claim 13 wherein said second radio is a half duplex radio.

17. A method of channel conversion of communicated data using Time Division Duplexing where channel resources are divided in time into fixed size frames comprising the steps of:
   (a) transmitting said data from a first radio in a transmit segment of said fixed size frame wherein said first radio establishes a frame timing of said fixed size frame;
   (b) scanning at least two different channels by a half duplex radio until data is received on a first one of said at least two different channels;

(c) receiving said data from the first radio by said half duplex radio in a receive segment of said fixed size frame;
(d) buffering the data in said half duplex radio;
(e) transmitting the data by said half duplex radio in a transmit segment of said fixed size frame; and,
(f) receiving said data by a second radio in a receive segment of said fixed size frame.

18. The method of claim 17 wherein said half duplex radio frequency scans to monitor at least two frequency channels.

19. The method of claim 17 wherein said first radio transmits a synchronization burst.

20. The method of claim 19 wherein said synchronization burst comprises a tone followed by a synchronization preamble.

21. The method of claim 19 wherein said synchronization burst is long enough for said half duplex radio to scan said at least two different channels and detect said burst on one of two channels.

22. The method of claim 21 wherein said first radio is a half duplex radio.

23. The method of claim 21 wherein said second radio is a half duplex radio.

24. A system of channel conversion of communicated data using Time Division Duplexing where channel resources are divided in time into fixed size frames comprising:
a first radio transmitting data to a half duplex radio in a transmit segment of said fixed frame and wherein said first radio establishes a frame timing of said fixed size frame;
said half duplex radio receiving the data in a receive segment of said fixed frame, said half duplex radio further buffering said data and retransmitting the data to a second radio in a transmit segment of said fixed frame; and,
said second radio receiving the data from the half duplex radio in a receive segment of said fixed frame.

25. The system of claim 24 wherein said half duplex radio scans at least two different channels until data is received on a first one of said at least two said different channels.

26. The system of claim 24 wherein said first radio is a half duplex radio.

27. The system of claim 24 wherein said second radio is a half duplex radio.

28. The system of claim 24 wherein a frequency scanning means is utilized to monitor at least two frequency channels.

29. The system of claim 28 wherein one of said at least two frequency channels is a frequency hopping channel.

30. The system of claim 24 wherein said first radio transmits a synchronization burst.

31. The system of claim 30 wherein said synchronization burst comprises a tone followed by a synchronization preamble.

32. The system of claim 31 wherein said synchronization burst is long enough for said half duplex radio to scan at least two different channels and detect said burst on a one of said two different channels.

* * * * *